(12) United States Patent
Ferraris

(10) Patent No.: US 8,453,561 B2
(45) Date of Patent: Jun. 4, 2013

(54) SUPPORT TO HOLD CUPS AND COFFEE MACHINE OR THE LIKE COMPRISING SAID SUPPORT

(75) Inventor: Luca Ferraris, Bologna (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 838 days.

(21) Appl. No.: 12/594,411

(22) PCT Filed: Mar. 28, 2008

(86) PCT No.: PCT/IT2008/000207
§ 371 (c)(1),
(2), (4) Date: Oct. 2, 2009

(87) PCT Pub. No.: WO2008/123003
PCT Pub. Date: Oct. 16, 2008

(65) Prior Publication Data
US 2010/0242738 A1    Sep. 30, 2010

(30) Foreign Application Priority Data
Apr. 6, 2007 (IT) ............................... FI20070020 U

(51) Int. Cl.
*A47J 31/44* (2006.01)
*B67D 1/16* (2006.01)

(52) U.S. Cl.
USPC ............................................ 99/284; 222/108

(58) Field of Classification Search
USPC .. 99/279, 284; 222/108; 248/297.31; 182/33, 182/35
See application file for complete search history.

(56) References Cited

U.S. PATENT DOCUMENTS

| | | | | |
|---|---|---|---|---|
| 668,867 A | * | 2/1901 | Ashe | 222/108 |
| 866,807 A | * | 9/1907 | Pitts | 222/108 |
| 3,327,902 A | * | 6/1967 | Alterwitz | 222/108 |
| 5,556,692 A | * | 9/1996 | Zheng | 428/156 |
| 5,960,995 A | * | 10/1999 | Leatherman et al. | 222/108 |
| 2007/0000944 A1 | | 1/2007 | Cahen et al. | |

FOREIGN PATENT DOCUMENTS

| | | |
|---|---|---|
| DE | 79 15 161 | 8/1979 |
| WO | WO 01/72190 | 10/2001 |

* cited by examiner

*Primary Examiner* — Kien Nguyen

(57) ABSTRACT

A support to hold a beverage receiving container in a machine for the preparation of beverages designed to position the container at two different heights with respect to a dispensing spout of the machine.

18 Claims, 3 Drawing Sheets

SUPPORT TO HOLD CUPS AND COFFEE MACHINE OR THE LIKE COMPRISING SAID SUPPORT

TECHNICAL FIELD

The present invention relates to a support to hold cups in machines for the preparation of beverages, for example and in particular (although not exclusively) coffee.

BACKGROUND ART

In particular, coffee machines have a brewing unit inside which there is placed a dose of coffee, obtained by extemporaneously grinding coffee beans, or by loading with powdered coffee, or yet again contained in a single serving sachet such as a capsule, pod or the like. The brewing unit is connected on one side to a boiler and a pump to supply pressurized hot water and on the other to one or more coffee dispensing spouts, under which a container, or a pair of containers, such as cups, glasses or the like, are placed, to receive the dispensed coffee.

To hold the cup these machines have a support placed under the dispensing spout or spouts. Usually, the height at which the dispensing spout is or the pair of dispensing spouts are positioned is adjustable to modify the distance between the dispensing spouts and the cup disposed on the support. This is useful as coffees of different types can be prepared with the same machine, for example espresso coffee or fresh brew coffee. In the first case cups of small size are used to receive the coffee, while in the second case taller cups are used, requiring more space between the support and the dispensing spout.

The support for the cups usually comprises a grid, disposed in a substantially horizontal position and which is generally constituted by a flat element with one or more holes, slots or openings of various shape to allow liquids to drain towards a drip tray below. Grid is intended, in this context, both as a lattice structure, and more generally as a wall with one or more through holes, slots or openings of various shape to drain liquids towards the tray under said grid.

In order to obtain two different heights at which the cup can be placed, US Patent Application Publication N. 2007/0000944 discloses a coffee machine wherein two superposed grids are provided, arranged above a drip tray. Small cups are placed on the upper grid. If larger cups are used, e.g. for the preparation of so called fresh-brew or regular coffee, the upper grid is removed, and the cup is placed on the lower grid.

This known machine, therefore, requires two separate grids to be manufactured and mounted on the machine. Such approach increases the costs and results in an unpractical device, since the user has to handle separate accessories (the two grids) to adapt the machine according to needs.

WO-A-01/72190 discloses a coffee machine including a cup supporting grid, the distance of which from the spout can be adjusted. In order to achieve this result, adjusting means are provided, which comprise mutually nesting elements adjustable in height by sliding and distributed over at lest two opposite regions of a side wall of the tray and of the grid periphery. This arrangement is expensive to produce.

German Utility Model 7915161 discloses an espresso machine with a cup supporting plate, which can be arranged at two different heights. This known machine does not provide for a drip tray.

SUMMARY OF THE INVENTION

According to one aspect, an object of the invention is to provide a support for cups in coffee machines or other machines for the preparation of beverages.

According to another aspect, an object of the present invention is to provide a machine for the preparation of beverages, in particular although not exclusively a coffee machine, which is more economic in relation to obtaining adaptability of the height at which the cup to receive the beverage is placed with respect to the dispensing spout or spouts.

Substantially, according to one aspect of the present invention, a machine for the preparation of beverages is provided, comprising at least one beverage dispensing spout and a support for at least one beverage receiving container, such as a cup or the like, disposed on a tray positioned under said at least one dispensing spout, wherein the support is designed to be positioned at two different distances from the dispensing spout.

In one embodiment, the support has a grid to hold the container, provided with a perimeter rim which at least partly surrounds the container holding grid. Advantageously, said rim projects from only one side of the grid, forming a spacer with respect to the drip tray below. According to the orientation taken by the support, the grid will therefore be positioned at different distances from the drip tray below. If the grid is inserted with the spacer rim facing downwards, it will be positioned at a greater height. If the rim is oriented upwards it will be disposed at a lesser height.

In this way it is possible to define a supporting surface of the beverage receiving cups at two substantially different heights, to receive containers differing even considerably in height, without the need to make the dispensing height of the beverage dispensing spouts or nozzles adjustable and therefore simplifying the structure of the hydraulic circuit of the machine, with a consequent reduction in the cost of the machine.

As a rule, the rim partly surrounding the cup holding grid can project by different degrees from both faces or sides of the grid. Preferably, however, it will be disposed so that it projects only from one side, while on the other side the surface of the cup holding grid will be smooth or at most provided with a projection along the perimeter or a part of the perimeter, to prevent the cups from accidentally slipping.

In one embodiment the support comprises:
  a container holding grid, said grid having a first face and a second face opposite each other to hold said container;
  and a rim at least partly surrounding said grid, which projects with respect to at least one of said first and second face of the grid and preferably surrounding only two or only three sides of the grid.

Preferably, the rim surrounds the grid substantially along three sides, leaving a fourth side of the grid free, to facilitate insertion of the cup and removal of the cup.

In one embodiment, the support has members for engaging with the machine, to prevent the support from moving accidentally when it is mounted. In a preferred embodiment, the engaging members comprise guide elements substantially orthogonal to the cup holding grid, cooperating with corresponding guide elements integral with a fixed structure of the machine. For example, guide grooves and projections cooperating therewith can be provided. The grooves can be provided on the support and the projections on the chassis of the machine or vice versa.

BRIEF DESCRIPTION OF THE DRAWINGS

The invention will be better understood by following the description and accompanying drawing, which shows a non-limiting practical embodiment of the invention. More specifically, in the drawing.

Figure 1A:
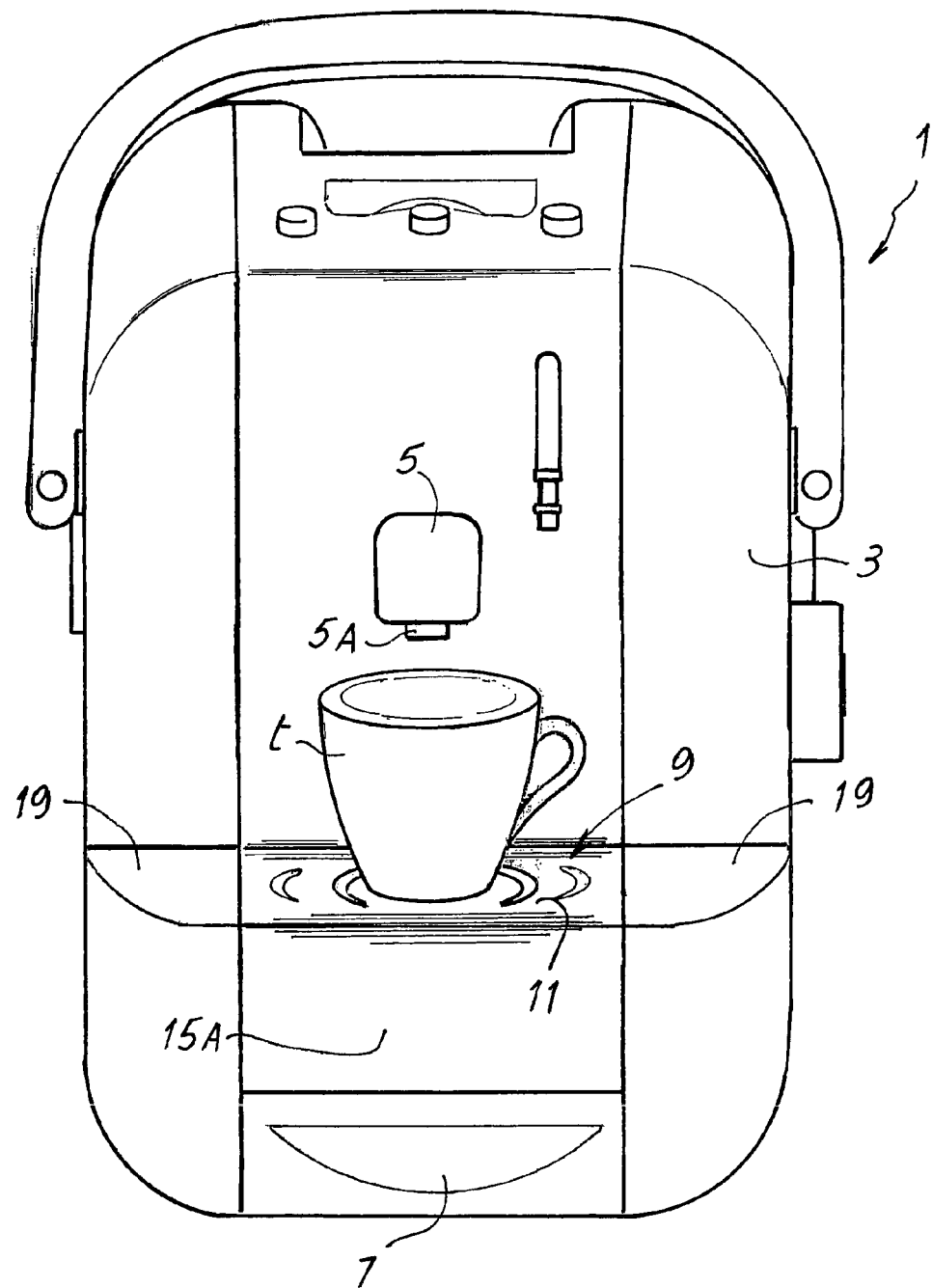
FIGS. 1A and 1B show front views of the coffee machine in which the present invention is incorporated, with the cup support in two different alternative positions.

In the accompanying figures, reference number 1 indicates as a whole a coffee machine, advantageously of automatic, combined or manual type. It must be understood that the invention as described below can also be used in coffee machines of other types, in particular with a greater or lesser degree of automation. It can also be used in machines for the preparation of other types of beverage.

The machine 1 has a body 3, inside which the usual machine components are disposed, such as the boiler, the water pump, the power supply circuit, the brewing unit, the motor for moving a movable brewing unit (if present), a grinder for grinding the coffee beans (if present), the electronic circuit with relative microprocessor and all other components required for operation of the machine, all known and not described in greater detail herein.

On the front of the body 3 of the machine there is disposed a dispensing unit 5, with single dispensing spout 5A. In this embodiment the spout 5A can be arranged at a fixed height with a simpler and more economical structure with respect to the one normally used in these machines, where the height of the dispensing spout is adjustable. It would also be possible to provide a different number of spouts, for example a pair of spouts or three or more dispensing spouts.

In one embodiment, under the dispensing spout 5A there is positioned a tray 7 removable from the front, to collect any liquids accidentally or intentionally delivered from the nozzle or spout 5A, for example during the heating step that precedes brewing of the coffee, in the descaling cycle or in other situations.

Figure 1B:
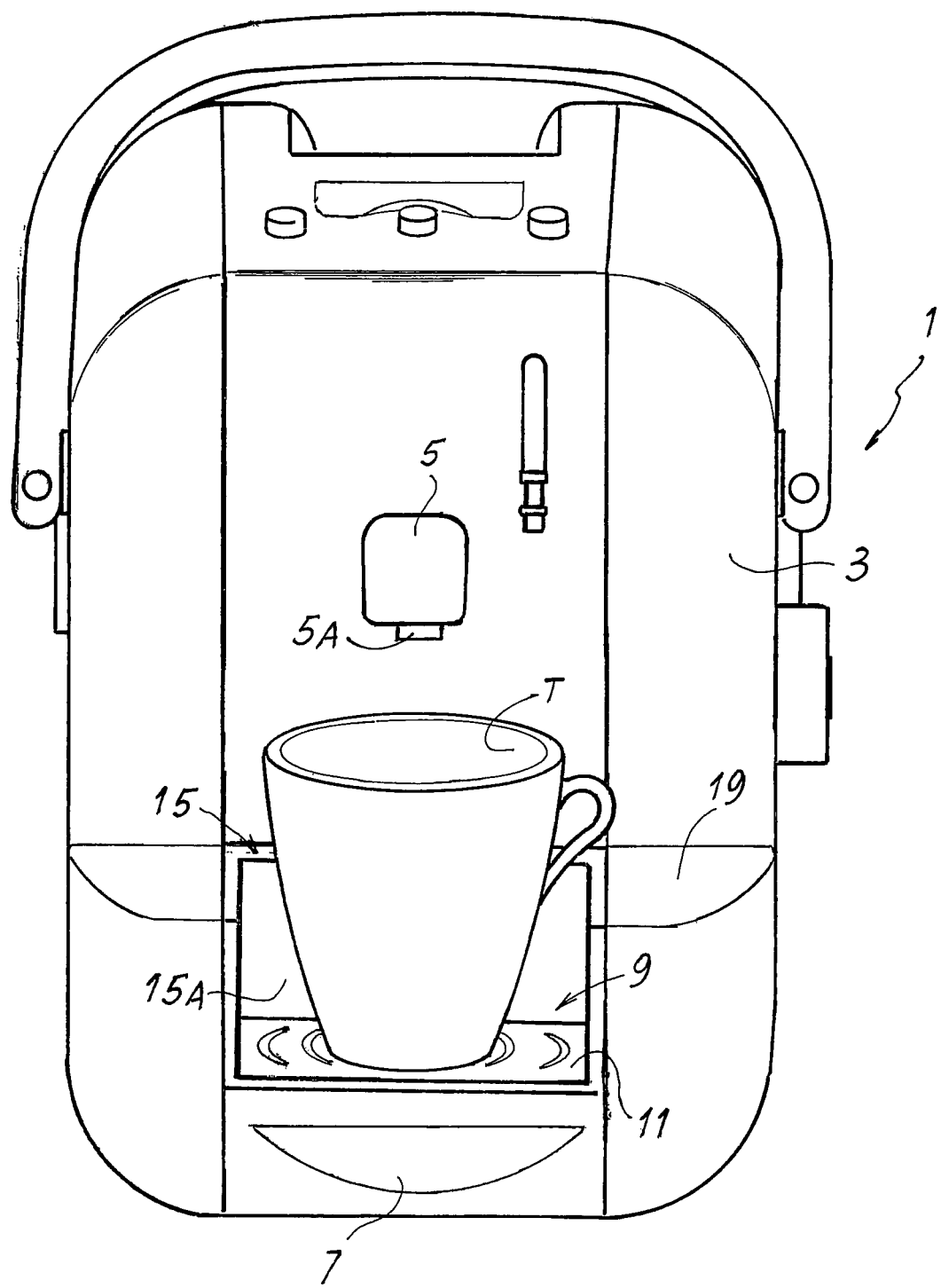

Above the tray 7 there is arranged a holding support 9 for a cup indicated schematically and with a broken line with t in FIG. 1A and with Tin FIG. 1B. The support 9 has a wall 11 with through openings 13. Said wall will be indicated hereinafter as grid to hold the cups t, T. The opposite faces of the grid 11 are indicated with 11A and 11B.

As can be observed in these figures, the cups t and T have dimensions, and in particular heights, substantially different from each other as they are intended to receive different qualities of coffee, typically espresso coffee in the case of the cup t and fresh brew coffee in the case of the cup T.

By comparing the two FIGS. 1A and 1B it can be seen that the support 9 for the cup T, t, can take two distinct positions in which the grid 11 takes two different heights, therefore two different distances with respect to the dispensing spout 5A. In FIG. 1A the support 9 is disposed with the grid 11 at a greater height, closer to the dispensing spout 5A, In FIG. 1B the support 9 is disposed with the grid 11 at a lesser height, therefore further from the dispensing spout 5A, to allow a cup T of greater height to be inserted under said spout.

This possibility or reversible mounting of the support 9 is obtained by the particular configuration thereof. Said support is represented separately in FIGS. 2A and 2B in the two positions taken respectively in FIG. 1A and in FIG. 1B.

Figure 2A:
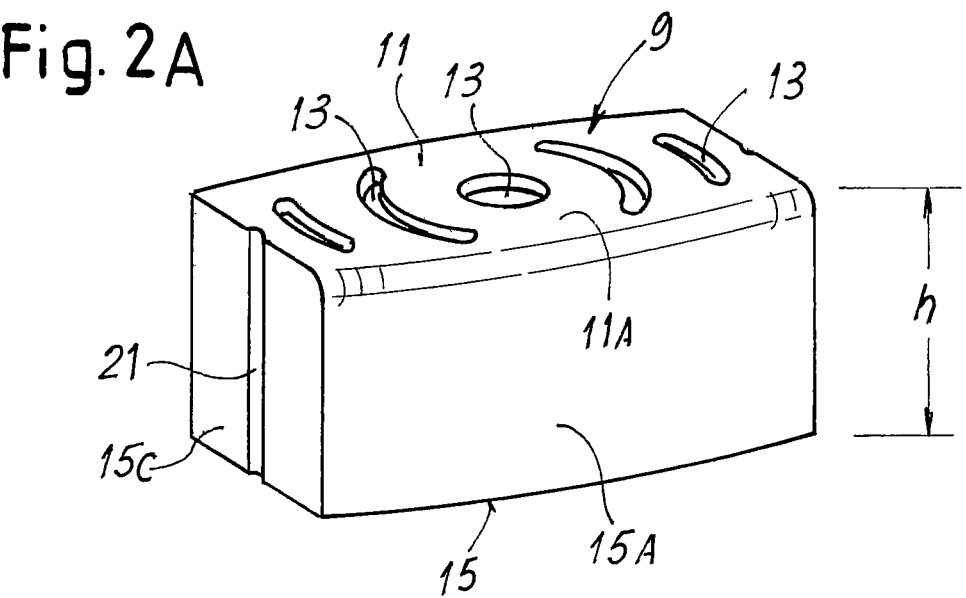
FIGS. 2A and 2B show two perspective views of the support in two distinct positions.
Figure 2B:
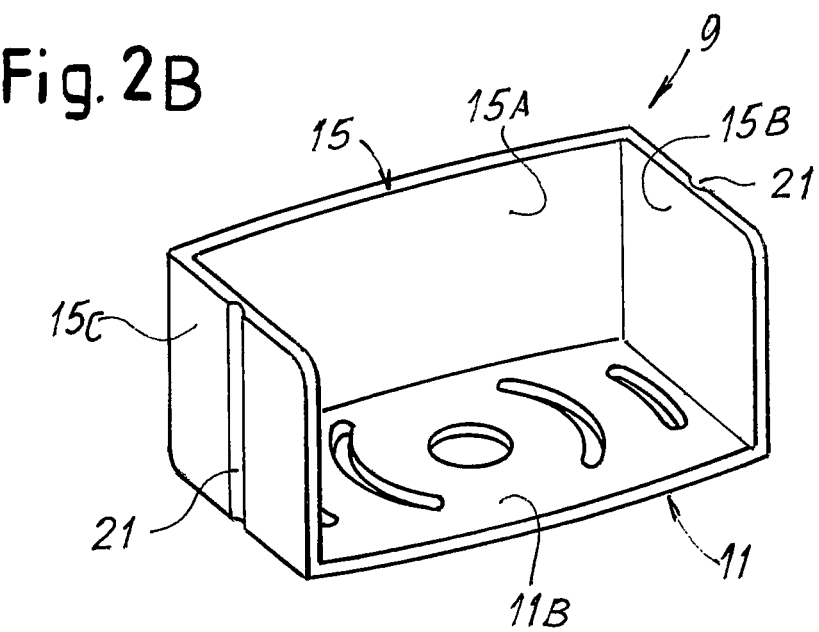

As can be observed in particular in FIGS. 2A, 2B, the grid 11 is surrounded on three sides by a rim 15 of considerable height, with 15A, 15B and 15C respectively indicating the portion along the long side and the two portions along the short sides of the grid 11. The rim 15 is of a height h corresponding substantially to the difference in the heights at which the grid 11 can be positioned in the machine 1.

When the support 9 is disposed in the machine as shown in FIGS. 1A and 2A, the front portion 15A of the rim 15 and the grid 11 are disposed to close a sort of niche on the bottom of which the tray 7 is disposed. The grid 11 therefore forms a continuous plane with two lateral surfaces 19 provided on the chassis of the body 3 of the machine 1. The grid 11 is at the maximum height and therefore closer to the dispensing spout 5A.

In the layout in FIGS. 1B, 2B the grid 11 is positioned directly above the tray 7 and at a substantially lower height (at a distance h) with respect to the height taken in FIGS. 1A, 2A. The rim 15 is position inside the niche closed at the bottom by the tray 7 and more specifically the portion 15A of the rim 15 is positioned further back with respect to the front part of the machine 1, against the central portion of the body 3 of the machine, on which the spout 5A is fitted.

To facilitate insertion and removal of the support 9 and increase the stability of positioning thereof in both layouts described herein, in one embodiment on the side portions 15B, 15C guides 21 are provided, which are substantially orthogonal to the grid 11, and in which there engage corresponding projections (not shown) provided on the sides of the niche formed in the front area of the body 3 of the machine 1 and extending over the removable tray 7. In this way the support 9 can be inserted with a vertical movement from the top downwards both in one and in the other of the two positions in FIGS. 1A, 2A and 1B, 2B respectively, to prevent the support from falling forward once it has been positioned on the machine. This simplifies mounting and makes the position of the support stable. In a modified embodiment, on the support projections can be provided, which are guided in grooves integral with the machine 9.

It is understood from the above description that with the support according to the invention the machine can be easily adapted to one or other of the two layouts to use espresso coffee cups or fresh brew coffee cups alternatively, without the need for the spout 5A to be movable and adjustable.

The invention claimed is:

1. A machine for the preparation of beverages, comprising:
a dispensing spout;
a support configured to position a container at two different heights with respect to the dispensing spout, the support including a grid with first and second opposite faces with each of the faces configured to hold the container;
two opposing vertical portions;
a vertical wall joining the two opposing vertical portions; and
a tray which together with the two opposing vertical portions and the vertical wall define a niche of the machine, wherein the support is designed to be positioned on the tray with the niche of the machine alternatively in two orientations, with one or other of the first and second opposite faces of the grid oriented upwardly thereby positioning the container at two different heights.

2. The support according to claim 1, further comprising a rim at least partly surrounding the grid, which projects by a different degree from the first and second opposite faces of said grid thereby positioning the container at two different heights.

3. The support as claimed in claim 2, wherein the rim projects from only one of the faces of the grid.

4. The support as claimed in claim 2, wherein the rim surrounds said grid substantially along three sides leaving a fourth side of the grid free such that a container positioned on the grid with the rim projecting upwards is surrounded along the three sides and is not surrounded on the fourth side.

5. A support to hold a beverage receiving container in a machine for the preparation of beverages, designed to position the container at two different heights with respect to a dispensing spout of the machine, the support comprising:
- a grid with first and second opposite faces, wherein the support is designed to be positioned on a tray of the machine alternatively in two orientations, with one or other of the first and second opposite faces of the grid oriented upwardly, to position the container at two different heights; and
- a rim at least partly surrounding the grid, which projects by a different degree from the first and second opposite faces of the grid, wherein the rim has guide elements substantially orthogonal to the grid, adapted to cooperate with corresponding guide elements integral with a fixed structure of the machine on which the support is mounted.

6. A machine for the preparation of beverages comprising:
- a least a beverage dispensing spout;
- two opposing vertical portions;
- a vertical wall joining the two opposing vertical portions;
- a tray which together with the two opposing vertical portions and the vertical wall define a niche of the machine; and
- a support for a beverage receiving container disposed above the tray, the support including a grid to hold the container, the grid having first and second opposite faces with each face configured to hold the container, wherein the support is designed to be positioned on the tray within the niche alternatively in one of two orientations, with one or other of the first and second opposite faces of the grid facing the spout, each one of the two orientations of the support allowing positioning of the container at a corresponding one of two different distances from the spout.

7. A machine for preparation of beverages, the machine comprising:
- a dispensing spout;
- two opposing vertical portions;
- a vertical wall joining the two opposing vertical portions; and
- a tray which together with the two opposing vertical portions and the vertical wall define a niche of the machine;
- a container holding grid, the grid having a first face and a second face opposite each other with each face configured to hold the container; and
- a rim at least partly surrounding the grid, which projects by a different degree from the first and second faces of the grid thereby the container alternatively at each one of two different heights when the grid is positioned within the niche.

8. The machine as claimed in claim 7, wherein the rim projects only from one of the faces of the grid.

9. The machine as claimed in claim 8, wherein the rim surrounds the grid substantially along three sides, leaving a fourth side of the grid free.

10. The machine as claimed in claim 9, wherein the rim has guide elements substantially orthogonal to the grid, cooperating with corresponding guide elements integral with two opposing vertical portions of the machine.

11. The machine as claimed in claim 7, wherein the rim surrounds the grid substantially along three sides, leaving a fourth side of the grid free.

12. The machine as claimed in claim 7, wherein the rim surrounds the grid substantially along three sides, leaving a fourth side of the grid free such that a container positioned on the grid with the rim projecting upwards is surrounded along the three sides and is not surrounded on the fourth side.

13. The machine as claimed in claim 8, wherein the rim has guide elements substantially orthogonal to the grid, cooperating with corresponding guide elements integral with two opposing vertical portions of the machine.

14. The machine as claimed in claim 12, wherein the rim has guide elements substantially orthogonal to the grid, cooperating with corresponding guide elements integral with two opposing vertical portions of the machine.

15. The machine as claimed in claim 7, wherein the rim has guide elements substantially orthogonal to the grid, cooperating with corresponding guide elements integral with two opposing vertical portions of the machine.

16. A machine for the preparation of beverages, the machine comprising:
- a container holding grid, the grid having a first face and a second face opposite each other to hold a container; and
- a rim at least partly surrounding the grid, which projects with respect to at least one of the first and second face of the grid, wherein the rim has guide elements substantially orthogonal to the grid, cooperating with corresponding guide elements integral with a fixed structure of the machine.

17. A machine for the preparation of beverages, the machine comprising:
- a container holding grid, the grid having a first face and a second face opposite each other to hold a container;
- a rim at least partly surrounding the grid, which projects with respect to at least one of the first and second face of the grid;
- at least one beverage dispensing spout;
- a tray positioned under the at least one dispensing spout; and
- a niche positioned under the at least one dispensing spout, delimited at the bottom by the tray and open at the top and at the front, in which the support is inserted and in which when the support is inserted with the rim thereof facing downwards, the rim closing the niche at the front, while when the support is inserted with the rim thereof facing upwards, the side thereof without a rim is facing outwards, leaving the niche substantially open at the front and at the top, and the grid is disposed to form the bottom of the niche.

18. A machine for the preparation of beverages, the machine comprising:
- a container holding grid, the grid having a first face and a second face opposite each other to hold a container;
- at least one beverage dispensing spout;
- a tray positioned under the at least one dispensing spout; and
- a rim at least partly surrounding the grid, which projects a different degree from the first and second face of the grid to position a container resting on the grid at two different distances above the tray, wherein the rim has guide elements substantially orthogonal to the grid, cooperating with corresponding guide elements integral with a fixed structure of the machine.

* * * * *